United States Patent
Sorotokin (10) Patent No.: US 9,213,681 B2
(45) Date of Patent: Dec. 15, 2015

(54) METHOD AND SYSTEM TO MODIFY SOURCE CONTENT TO FIT INTO A TARGET DISPLAY AREA IN A BROWSER

(75) Inventor: Peter Sorotokin, San Jose, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 548 days.

(21) Appl. No.: 12/900,948

(22) Filed: Oct. 8, 2010

(65) Prior Publication Data

US 2014/0040719 A1 Feb. 6, 2014

(51) Int. Cl.
*G06F 17/00* (2006.01)
*G06F 17/21* (2006.01)

(52) U.S. Cl.
CPC ..................... *G06F 17/211* (2013.01)

(58) Field of Classification Search
CPC ..... G06F 17/211; G06F 17/212; G06F 17/24; G06F 17/2247; G06F 17/30905; G06F 17/21
USPC ......................................... 715/234, 243, 246
See application file for complete search history.

(56) References Cited

U.S. PATENT DOCUMENTS

| | | | |
|---|---|---|---|
| 6,256,650 B1 * | 7/2001 | Cedar et al. | 715/235 |
| 7,743,325 B2 * | 6/2010 | Berker et al. | 715/256 |
| 2005/0223320 A1 * | 10/2005 | Brintzenhofe et al. | 715/517 |
| 2006/0117255 A1 * | 6/2006 | Seeler | 715/520 |
| 2006/0156232 A1 * | 7/2006 | Giannetti et al. | 715/530 |
| 2008/0282147 A1 * | 11/2008 | Schorr | 715/243 |
| 2009/0319888 A1 * | 12/2009 | Oygard | 715/256 |

* cited by examiner

*Primary Examiner* — Kavita Padmanabhan
*Assistant Examiner* — Ariel Mercado
(74) *Attorney, Agent, or Firm* — Shook, Hardy & Bacon, L.L.P.

(57) ABSTRACT

A method and system to automatically adjust content being layed out into a target area for browser rendering is provided. An example method comprises a first pass module, a progress data collector, a second pass module, and a communications module. The first pass module may be configured to perform a first pass of laying out source content into a total target area to determine a total crash area consumed by the source content. The progress data collector may be configured to collect progress data associated with the laying out of the source content into the total target area. The second pass module may be configured to perform a second pass of laying out of the source content into the total target area to generate a data object model. The communications module may be configured to provide the data object model to a browser engine for rendering.

18 Claims, 6 Drawing Sheets

METHOD AND SYSTEM TO MODIFY SOURCE CONTENT TO FIT INTO A TARGET DISPLAY AREA IN A BROWSER

TECHNICAL FIELD

This application relates to the technical fields of software and/or hardware technology and, in one example embodiment, to system and method to automatically adjust content being layed out into a target area for browser rendering.

BACKGROUND

Many printed publications, such as magazines, use layouts where text fills a number of pages completely, without gaps or space left at the end. Currently it is done at design time by hand, which is relatively simple because a printed magazine has a well-defined page dimensions and font. When magazine content, e.g., a magazine article, is provided on an electronic display device via a web browser application, the associated text and images are often displayed either without the notion of printed pages (where the article appears continuously and different portions of the article can be viewed by scrolling up and down in the browser window) or in a way that leaves the last page of the electronic version of the article not quite filled to the very end.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

When content from a printed publication needs to be displayed on a wide variety of electronic devices that may have different aspect ratios, orientation, and may also allow for font size selection, it may be too costly to design by hand layouts for all desired combinations of device dimensions and font sizes. Dimensions of the layout elements of a content item (e.g., a magazine article) can be fitted into a shape of particular dimensions by a number of well-known methods (e.g., layout managers in user interface (UI) design). A browser engine provides only a limited set of interfaces to the text layout engine, which makes it challenging to build an efficient browser-based text-fitting algorithm. In addition, many browser-based controls are not very precise: for instance, many parameters are typically rounded to an integer number of pixels. A method and system are provided to automatically adjust content being layed out into a target area for browser rendering. The method and system, also referred to as automatic text fitting, may be utilized beneficially for fitting the text into the available space or target area using a web browser or an application utilizing a browser engine as a rendering platform.

In one embodiment, a text fitting system takes, as input, (1) space to be filled with text—a target area that can be represented by a sequence of rectangles or any other shapes and (2) source text—styled text, which, in the browser context, may be a sequence of document object model (DOM) elements with cascading style sheets (CSS) styling applied to it. The text fitting system modifies styling of the text in such a way that the given text fills up all or almost all of the target area.

The text fitting process may be described as being performed two passes. On the first pass, the source text is layed out in the space provided (e.g., target area represented by shapes) without modifications to its styling. Layout is performed in granular fashion by appending segments of the source text, one by one. As text is being layed out, one text segment at a time, for each point in the layout process, a pair of progress values is being recorded. The first progress value in the pair is the character position. A character position value indicates a specific position in the source text. The other progress value in the pair is total area that has been consumed thus far (consumed area value). The consumed area value, in one embodiment, indicates area consumed by a portion of the source text ending at the specific position in the source text. In general, the consumed area value indicates space (e.g., geometric area) consumed by the source content. If the entire source text did not fit into the target area, an additional temporary shape is allocated to handle overflow.

When the first pass completes, the collected data can be interpolated to determine a consumed area value for each character position in the source text. As no attempt is done during the layout performed during the first pass to fit the text exactly into the target area, the actual area consumed at the completion of the first pass may be termed the crash area. The interpolated consumed area values based on the results of the first pass may be termed consumed crash area values. A text segment may be any portion of the text, e.g., a paragraph, a sentence, a certain number of words, etc. The DOM that may result from performing the first pass may be discarded.

It will be noted, that while references are made in the specification to the source text and to the number of characters that has been layed out, the source content may be other than merely text, but one or more images or a combination of text and one or more images. The text fitting method may thus be applied to source content (that may be in the form of source text), while the first value in a pair of progress values may thus be content position (that may be in the form of a character position).

Once the first pass is completed and the progress data is collected, the second pass is commenced. On the second pass, as the text is being layed out once again, segment by segment, the pairs of progress values (character position and consumed area) are being calculated for each segment of the text again. The data collected on the first path is consulted to determine an adjustment factor for each segment of the source text that is being layed out. The adjustment factor may be used to determine how much the content of the associated segment needs to be stretched or shrunk.

In one embodiment, the adjustment factor is calculated by dividing the value representing the area that currently remains to be consumed after the content has been layed out up to a particular content position by the value representing the area that remained to be consumed on the first pass after the content has been layed out up to the same character position. Once the adjustment factor is determined, the text fitting method calculates the area that was attributed to the next segment of text during the first pass. The text fitting method then multiplies the calculated segment crash area by the adjustment factor to determine how much more or how much less area the next segment of text is expected to cover. The text fitting method then locally adjusts one or more styling parameters for that next segment of text such that the next text segment would take up approximately as much space as is being targeted. Various styling parameters can be adjusted in order to stretch or to shrink the text. Some of the styling parameters are associated with word spacing, letter spacing, font-size, line height, etc.

Thus, for the very first segment to be layed out during the second pass, where the text position value represents the entire source text yet to be layed out, the adjustment factor is calculated by dividing the target area value by the crash area value (the area that was consumed during the first pass). For the next segment to be layed out, the new segment starting at a new character position (representing the next character after the last character of the first segment) is adjusted using a new adjustment factor. The new adjustment factor is calculated by dividing the new area to be consumed (associated with the new character position) by the crash area that remained to be consumed associated with the new character position. As explained above, the crash area consumed (and the associated crash area that remained to be consumed) for every character position in the source text, including the new character position, can be determined by interpolating the pairs of progress values collected during the first pass.

Figure 1:
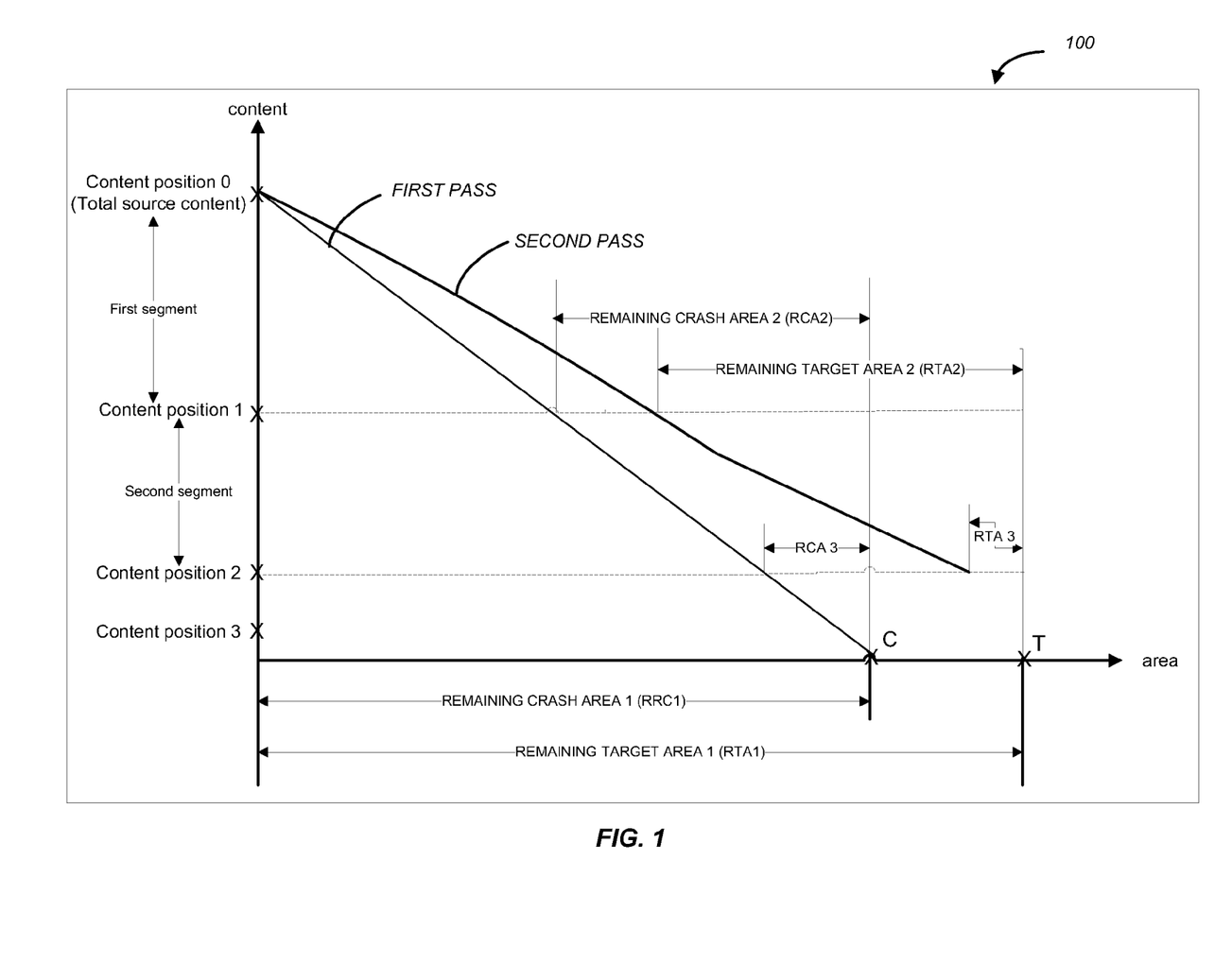
FIG. 1 is a graph representation of the laying out progress, in accordance with one example embodiment.

FIG. 1 is a view 100 showing a graph representing the laying out progress during the first pass and the second pass. As shown in FIG. 1, a value along the "content" axis represents the amount of content that is yet to be layed out. A value along the "area" axis represents area that has already been consumed by the layed out content. The first pass results in consuming the "crash area" marked on the "area" axis as "C," while the "target area" (the area that needs to be consumed in a manner as to avoid a gap at the end of the last page of the browser-rendered content) is marked on the "area" axis as "T."

As explained above, for the very first segment to be layed out during the second pass, where the text position value represents the entire source text yet to be layed out ("content position 0" in FIG. 1), the adjustment factor is calculated by dividing the remaining target area value (RTA1) by the remaining crash area value (RCA1). The style of the first segment is adjusted according to the adjustment factor prior to appending it to the already-layed out content (in this case, starting from the beginning of the target area). For the next segment to be layed out (second segment starting at "content position 1" and ending at "content position 2" in FIG. 1), the new adjustment factor is calculated by dividing the RTA2 value by the RCA2 value. The style of the second segment is adjusted according to the new adjustment factor prior to appending it to the already-layed out first segment in the target area. Similarly, the style of the third segment (the segment starting at "content position 2" and ending at "content position 3" in FIG. 1) is adjusted according to the new adjustment factor that is calculated by dividing the "RCA3" value by the "RTA3" value.

Figure 2:
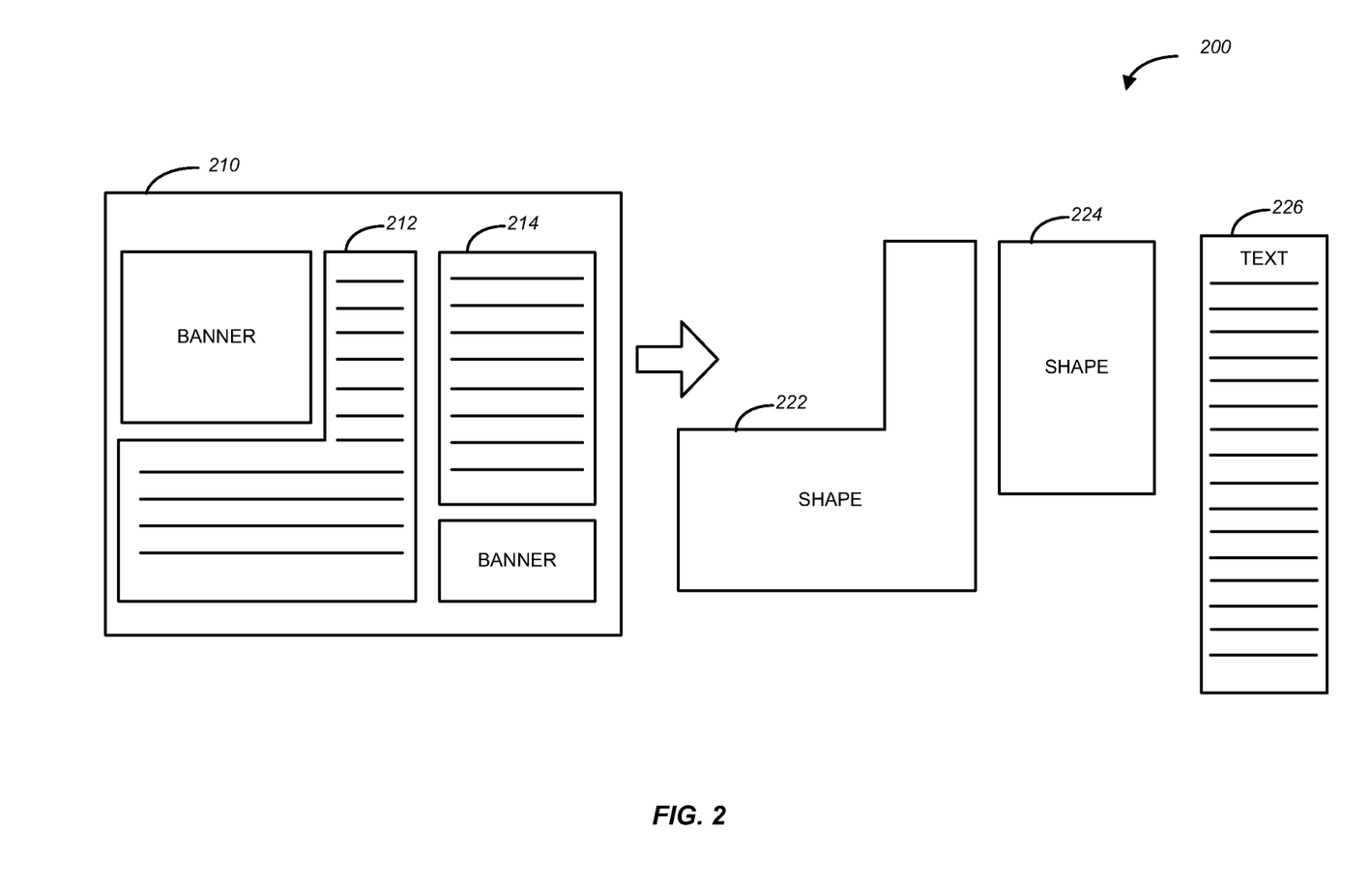
FIG. 2 is a diagrammatic representation of a magazine article presented in a printed publication and a representation of the same magazine article in the form of text and shapes for browser rendering, in accordance with one example embodiment.

FIG. 2 illustrates a view 200 showing a page 210 of a magazine article presented in a printed publication and a representation of the same magazine article in the form of text 226 and shapes 222 and 224. The areas 212 and 214 of the page 214 correspond to the shapes 222 and 224 respectively. The text 226 (that may be structured using HTML) and the shapes 222 and 224 may be used as input to be processed by a text fitting system to produce a data object model (DOM) that, when rendered by a browser, results is a representation of the page 210 without an unused space at the end of the page.

Figure 3:
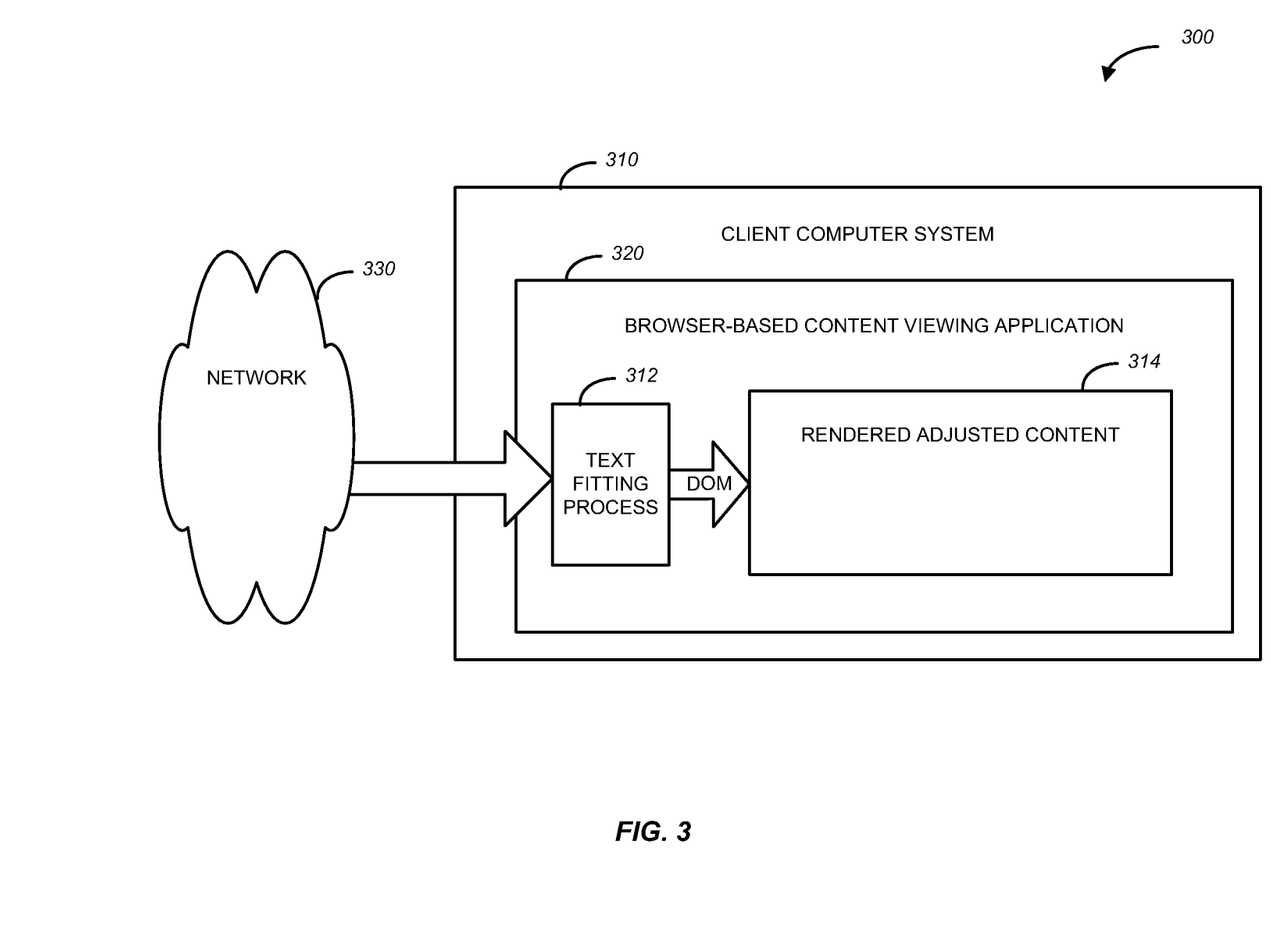
FIG. 3 is a diagrammatic representation of example architecture within which method and system to automatically adjust content being layed out into a target area for browser rendering may be implemented, in accordance with one example embodiment.

Example architecture 300 within which method and system to automatically adjust content being layed out into a target area for browser rendering may be implemented is described with reference to FIG. 3. As shown in FIG. 3, the architecture 300 comprises a client computer system 310 hosting a browser-based content-viewing application 320

(that can be a browser application or a viewing application utilizing a browser engine) configured to display web pages. The browser-based content-viewing application 320 may include a text fitting system 312 configured to process input representing source content and area to be completely consumed by the source content, and produce adjusted content for rendering. FIG. 3 shows a rendered adjusted content 314. A magazine article included in a web page may be provided to the browser-based content-viewing application 320 utilizing a network 330. While the text fitting system 312 is shown in FIG. 3 as being included in the based content-viewing application 320, in one embodiment, a text fitting system may be included in a web page as a JavaScript (JS) script or a reference to a JS script. The client computer system 310 may be a desktop computer, a mobile device such as, e.g., a tablet computer or a smart phone, etc. An example system to automatically adjust content being layed out into a target area for browser rendering, may be described with reference to FIG. 4.

Figure 4:
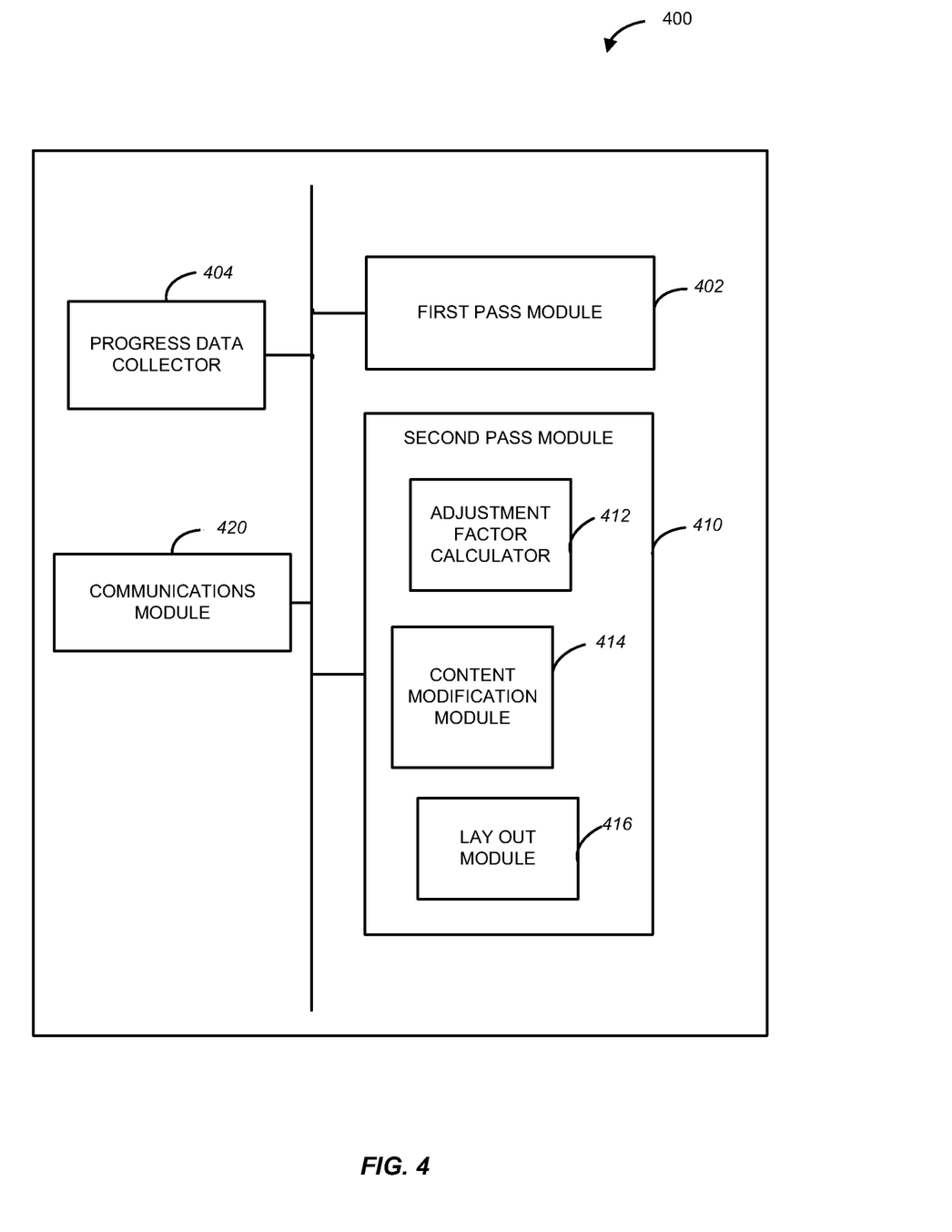
FIG. 4 is a block diagram of a system to automatically adjust content being layed out into a target area for browser rendering, in accordance with one example embodiment.

FIG. 4 is a block diagram of a system 400 configured to automatically adjust content being layed out into a target area for browser rendering, in accordance with one example embodiment. The system 400 may be utilized advantageously, e.g., when a web page is to be displayed on devices having different aspect ratios and font sizes. Some of the modules of the system 400 may be part of a text fitting system, while some modules, may be provided by a browser-based application. Various modules shown in FIG. 4 may be implemented as software, hardware, or a combination thereof.

As shown in FIG. 4, the system 400 includes a first pass module 402, a progress data collector 404, a second pass module 410, and a communications module 420. The first pass module 402 may be configured to perform a first pass of laying out source content into a total target area to determine a total crash area consumed by the source content. The progress data collector 404 may be configured to collect progress data associated with the laying out of the source content into the total target area. As described above, the progress data is collected during the first pass of laying out of the source content and comprises a plurality of pairs of progress values, where one value is a content position value and another value is a consumed crash area value. The content position value is indicative of a specific position in the source content, and the consumed crash area value is indicative of an area consumed by a portion of the source content ending at the specific position in the source content. The second pass module 410 may be configured to perform a second pass of laying out of the source content into the total target area, while adjusting the style of the source content for each segment of the source content, to generate a data object model. The progress data collector 404 also collects progress data during the second pass; the progress data collected during the second pass may be termed current progress data. The communications module 420 may be configured to provide the data object model to a browser engine for rendering.

In one embodiment, the second pass module 410 comprises an adjustment factor calculator 412, a content modification module 414, and a layout module 416. The adjustment factor calculator 412 may be configured to calculate an adjustment factor for a segment of the source content utilizing progress data. The adjustment factor calculator 412 is to determine, for each segment of the source content, a content position value for a segment of the source content, a remaining target area value for the segment, the remaining target area value indicative of such portion of the total target area that is unconsumed by any portion of the source content, and a remaining crash area value for the content position. The remaining target area value for the segment may be determined utilizing current progress data collected by the progress data collector 404. The remaining crash area value, that can be determined by interpolating the progress data (collected during the first pass) to determine a consumed crash area value for the content position and subtracting the consumed crash area value from the total crash area, is indicative of such portion of the total crash area that remained unconsumed by any portion of the source content during the first pass. The adjustment factor calculator 412 is to calculate the adjustment factor by dividing the remaining target area value by the remaining crash area value.

The content modification module 414 may be configured to modify a segment of the source content based on the adjustment factor generated by the adjustment factor calculator 412 to produce a modified segment (e.g., by modifying one or more styling parameters for a segment of the source content). The layout module 416 may be configured to append the modified segment to content already layed out into a portion of the total target area. An example method utilizing the system 400 may be described with reference to FIG. 5.

Figure 5:
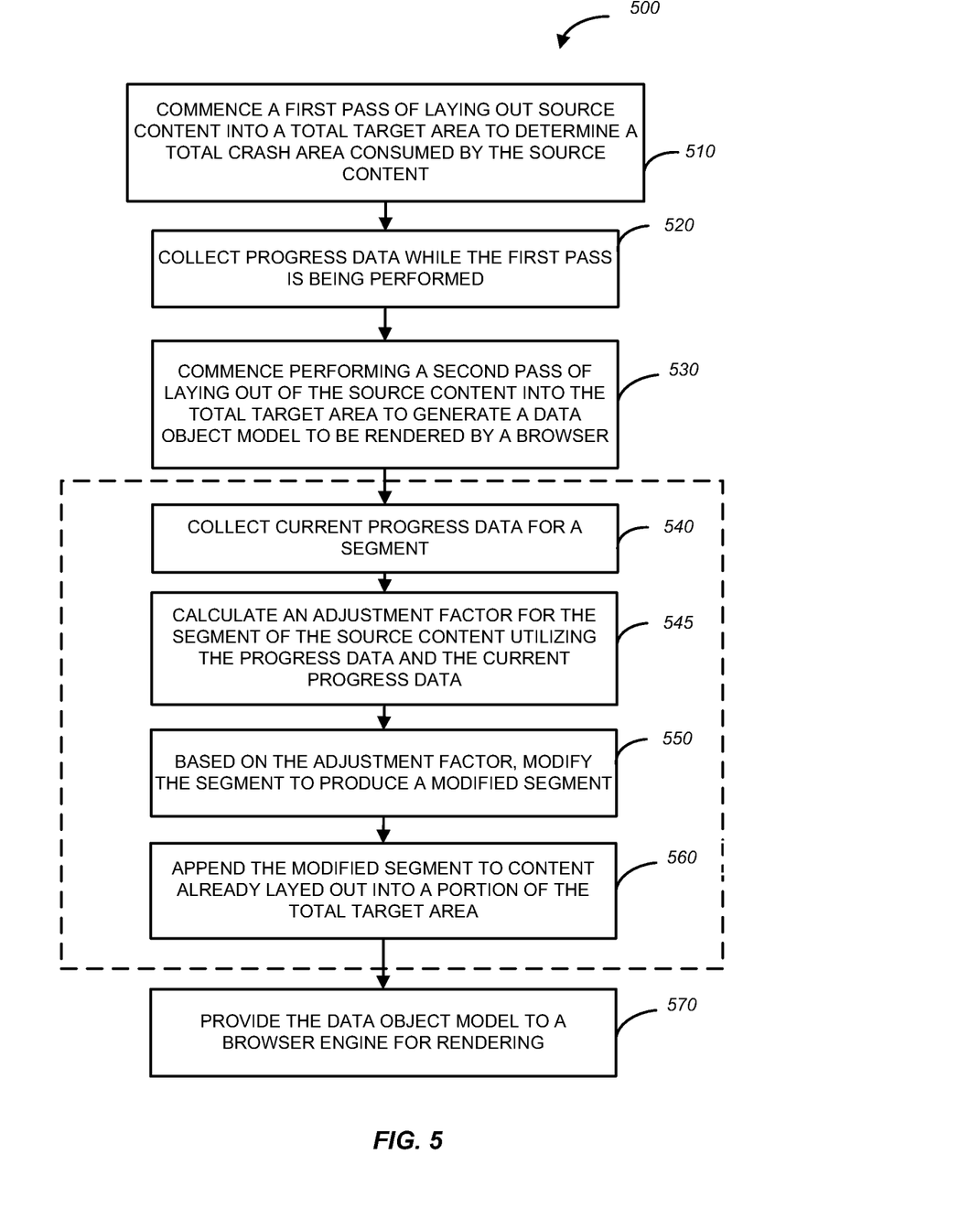
FIG. 5 is a flow chart of a method to automatically adjust content being layed out into a target area for browser rendering, in accordance with an example embodiment.

FIG. 5 is a flow chart of a method 500 to automatically adjust content being layed out into a target area for browser rendering, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the client computer system 310 of FIG. 3 and, specifically, at the system 400 shown in FIG. 4.

As shown in FIG. 5, the method 500 commences at operation 510, when the first pass module 402 of FIG. 4 commences a first pass of laying out source content into a total target area to determine a total crash area consumed by the source content. At operation 520, the progress data collector 404 of FIG. 4 collects progress data while the first pass is being performed. At operation 530, the second pass module 410 of FIG. 4 commences a second pass of laying out of the source content into the total target area to generate a data object model. As mentioned above, the progress data collector 404 of FIG. 4 collects current progress data for each content segment that is being layed out (operation 540). Operations 540-560 are performed for each segment of the source content while the second pass is being performed. At operation 545, the adjustment factor calculator 412 of FIG. 4 calculates an adjustment factor for a segment of the source content utilizing the progress data collected during the first pass and the current progress data for the segment. At operation 550, the content modification module 414 of FIG. 4 modifies the segment to produce a modified segment, based on the calculated adjustment factor. At operation 560, the layout module 416 of FIG. 4 appends the modified segment to content already layed out into a portion of the total target area. At operation 570, the communications module 420 of FIG. 4 provides the data object model to a browser engine for rendering.

Table 1 below includes example pseudo code illustrating text fitting process.

TABLE 1

Input parameters:
content is a sequence of content elements which can be styled text, images, vector graphics and any other elements that can be visualized.

TABLE 1-continued

```
Content can actually be structured (e.g., HTML), but that structure is
not important for the algorithm itself.
shapes is a sequence of regions in which content is being flown (or layed)
into targetArea is total area of all shapes
All input parameters are reset to their original state between passes.
Data structures
data is a sequence of pairs (contentPosition, areaConsumed)
Functions
Function layout(shapes,  x) represents adding content element x to the
layout, consuming some portion of shapes and calculating area consumed
Function contentSize(x) represents "size" of the content element x, it can
be anything that can be used to judge the size of that content, e.g.
character count + some size can be attributed to inline images.
Function    interpolate(data,    contentPosition)    returns    the
approximation of the areaConsumed given data and contentPosition, using
interpolation, e.g. linear interpolation
Function getNextPortionOfContent (content) gets the next content
element from the sequence of content elements content and returns it.
Function  applyStretch(content,   stretchFactor,   area)  applies
stretching  or  shrinking  of  the  content  content  by  manipulating
spacing parameters to make it occupy proportionally more
(if stretchFactor>1) or less (if stretchFactor<1) space. area parameter
provides an estimate of the area that this content would occupy if no
stretching (stretchFactor=1) is applied which may be useful for spacing
parameter calculations, e.g. required word spacing can be estimated as
(stretchFactor − 1) * area / (lineHeight * wordBreakCount)
First pass: perform a dry run and collect data
    add (0,0) to data
    contentPosition := 0
    areaConsumed := 0
    while have some content
        currentContent := getNextPortionOfContent(content)
        contentPosition := contentPosition +
contentSize(currentContent)
        currentArea := layout(currentContent)
        areaConsumed := areaConsumed + currentArea
        add (contentPosition, areaConsumed) to data
    end
    totalContentSize := contentPosition
    pass1TotalArea := areaConsumed
Second pass: actual layout
    contentPosition := 0
    areaConsumed := 0
    pass1AreaConsumed := 0
    while have some content
        areaLeft := targetArea − areaConsumed
        areaLeftPass1 := pass1TotalArea − pass1AreaConsumed
        stretchFactor := areaLeft / areaLeftPass1
        currentContent := getNextPortionOfContent(content)
        contentPosition := contentPosition +
contentSize(currentContent)
        nextPass1AreaConsumed := interpolate(data,
contentPosition)
        pass1Area = nextPass1AreaConsumed − pass1AreaConsumed
        applyStretch(currentContent, stretchFactor, pass1Area)
        currentArea := layout(currentContent)
        areaConsumed := areaConsumed + currentArea
        pass1AreaConsumed = nextPass1AreaConsumed
    end
```

Figure 6:
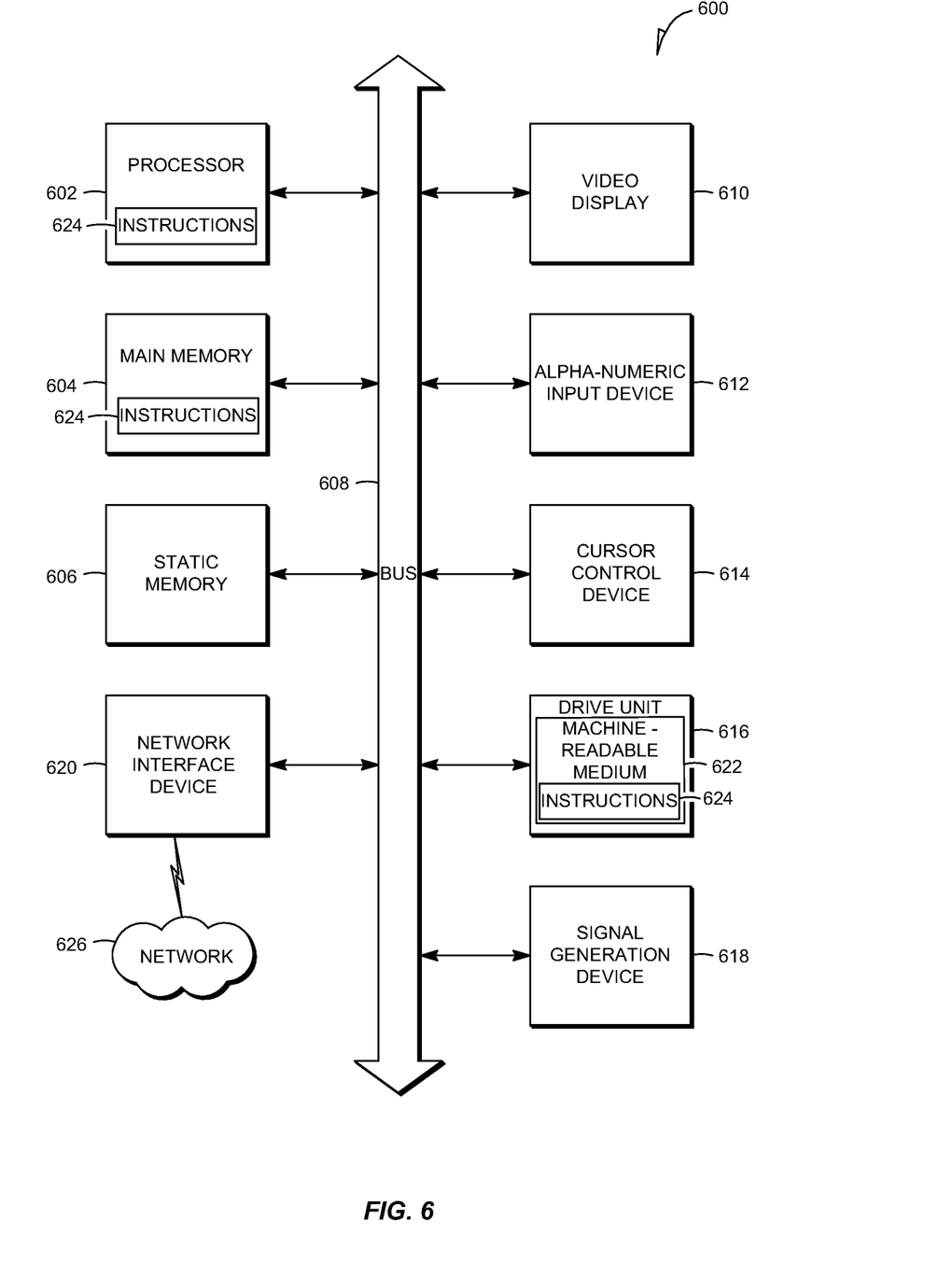
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system to automatically adjust content being layed out into a target area for browser rendering has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:

performing, using a computer, a first pass of laying out source content into a total target area to determine a total crash area consumed by the source content, the first pass comprising collecting progress data; and performing a second pass of laying out a plurality of segments of the source content into the total target area to generate a data object model, the second pass performed after the first pass has been performed, wherein the second pass comprises at least:

for a first segment of the plurality of segments corresponding with a first content position in the source content:

collecting current progress data for the first segment of the plurality of segments, determining a first remaining target area value using the current progress data for the first segment, the first remaining target area value indicating a first portion of the total target area remaining to be consumed at the first content position during the second pass, determining a first remaining crash area value based on the progress data, the first remaining crash area value indicating a first portion of the total crash area that remained to be consumed at the first content position during the first pass, calculating a first adjustment factor for the segment of the source content as a function of the first remaining target area value and the first remaining crash area value, based on the adjustment factor, modifying the segment to produce a modified segment, and appending the first modified segment to a first content portion already laid out in the total target area; and for a second segment of the plurality of segments corresponding with a second content position in the source content:

collecting current progress data for the second segment of the plurality of segments, determining a second remaining target area value using the current progress data for the second segment, the second remaining target area value indicating a second portion of the total target area remaining to be consumed at the second content position during the second pass, determining a second remaining crash area value based on the progress data, the second remaining crash area value indicating a second portion of the total crash area that remained to be consumed at the second content position during the fist pass, calculating a second adjustment factor for the second segment of the source content as a function of the second remaining target area value and the second remaining crash area value, based on the second adjustment factor, modifying the second segment to produce a second modified segment, and appending the second modified segment to a second content portion already laid out in the total target area; and providing the data object model to a browser engine for rendering.

2. The method of claim 1, wherein the progress data comprises a plurality of pairs of progress values, a pair of progress values from the plurality of pairs comprising a content position value and a consumed crash area value, the content position value indicative of a specific position in the source content, the consumed crash area value indicative of an area consumed by a portion of the source content ending at the specific position in the source content.

3. The method of claim 1, wherein the determining of the first and second remaining crash area values comprises, for each value:

interpolating the progress data to determine a consumed crash area value for the content position; and subtracting the consumed crash area value from the total crash area.

4. The method of claim 3, wherein the calculating of the first adjustment factor comprises dividing the first remaining target area value by the first remaining crash area value.

5. The method of claim 1, wherein the modifying of each segment comprises modifying a styling parameter of each segment.

6. The method of claim 1, wherein the source content comprises text structured using HyperText Markup Language (HTML).

7. The method of claim 1, wherein the total target area is represented by a plurality of shapes.

8. The method of claim 1, wherein the total crash area is less than the total target area.

9. The method of claim 1, wherein the total crash area is greater than the total target area.

10. A computer-implemented system comprising:

at least one processor;

a first pass module to perform, using the at least one processor, a first pass of laying out source content into a total target area to determine a total crash area consumed by the source content;

a progress data collector to collect, sing the at least one processor, (1) progress data for each segment of the plurality of segments identified during the first pass, the progress data being associated with the laying out of the source content into the total target area and (2) current progress data for each segment of the plurality of segments corresponding with a specific content position in the source content during a second pass of laying out the plurality of segments of the source content into the total target area; and a second pass module to perform, using the at least one processor, the second pass of laying out the plurality of segments of the source content into the total target area to generate a data object model, the second pass module comprising:

an adjustment factor calculator to calculate an adjustment factor, using the at least one processor, for each of the plurality of segments of the source content, wherein the adjustment factor calculator:

determines a first remaining target area value using current progress data for a fist segment corresponding with a first content position in the source content, the first remaining target area value indicating a first portion of the total target area remaining to be consumed at the first content position during the second pass, determine a first remaining crash area value based on the progress data, the first remaining crash area value indicating a first portion of the total crash area that remained to be consumed at the first content position during the first pass, calculates the first adjustment factor of the first segment of the source content as a function of the first remaining target area value and the first remaining crash area value, and wherein the adjustment factor calculator further:
    determines a second remaining target area value using the current progress data for a second segment corresponding with a second content position in the source content, the second remaining target area value indicating a second portion of the total target area remaining to be consumed at the second content position during the second pass,
    determines a second remaining crash area value based on the progress data, the second remaining crash area value indicating a second portion of the total crash area that remained to be consumed at the second content position during the first pass, and
    calculates a second adjustment factor for the second segment of the source content as a function of the second remaining target area value and the second remaining crash area value;
a content modification module to modify, using the at least one processor, each of the plurality of segments, based on the adjustment factor to produce a modified segment for each of the plurality of segments, wherein the content modification module modifies the first segment based on the first adjustment factor to produce a first modified segment, and wherein the content modification module modifies the second segment based on the second adjustment factor to produce a second modified segment, and
a layout module to append, using the at least one processor, for each of the plurality of segments, each of the first modified segment and the second modified segment to content already laid out into a portion of the total target area; and
a communications module to provide, using the at least one processor, the data object model to a browser engine for rendering.

11. The system of claim 10, wherein the progress data comprises a plurality of pairs of progress values, a pair of progress values from the plurality of pairs comprising a content position value and a consumed crash area value, the content position value indicative of a specific position in the source content, the consumed crash area value indicative of an area consumed by a portion of the source content ending at the specific position in the source content.

12. The system of claim 11, wherein the adjustment factor calculator is to determine the remaining crash area by:
    interpolating the progress data to determine a consumed crash area value for the content position; and
    subtracting the consumed crash area value from the total crash area.

13. The system of claim 12, wherein the adjustment factor calculator is to calculate the adjustment factor by dividing the remaining target area value by the remaining crash area value.

14. The system of claim 10, wherein the content modification module is to modify each segment by modifying a styling parameter of the segment.

15. The system of claim 10, wherein the source content comprises text structured using HyperText Markup Language (HTML).

16. The system of claim 10, wherein the total target area is represented by a plurality of shapes.

17. The system of claim 10, wherein the total crash area is less than the total target area.

18. A machine-readable non-transitory medium having instruction data to cause a machine to:
    perform, using a computer, a first pass of laying out source content into a total target area to determine a total crash area consumed by the source content, the first pass comprising collecting progress data; and
    perform a second pass of laying out a plurality of segments of the source content into the total target area to generate a data object model, the second pass performed after the first pass had been performed wherein the second pass comprises at least:
    for a first segment of the plurality of segments corresponding with a first content position in the source content:
        collecting current progress data for the first segment of the plurality of segments,
        determining a first remaining target area value using the current progress data for the first segment, the first remaining target area value indicating a first portion of the total target area remaining to be consumed at the first content position during the second pass,
        determining a first remaining crash area value based on the progress data, the first remaining crash area value indicating a first portion of the total crash area that remained to be consumed at the first content position during the first pass,
        calculating a first adjustment factor for the first segment of the source content as a function of the first remaining target area value and the first remaining crash area value,
        based on the first adjustment factor, modifying the first segment to produce a first modified segment, and
        appending the first modified segment to a first content portion already laid out in the total target area; and
    for a second segment of the plurality of segments corresponding with a second content position in the source content:
        collecting current progress data for the second segment of the plurality of segments,
        determining a second remaining target area value using the current progress data for the second segment, the second remaining target area value indicating a second portion of the total target area remaining to be consumed at the second content position during the second pass,
        determining a second remaining crash area value based on the progress data, the second remaining crash area value indicating a second portion of the total crash area that remained to be consumed at the second content position during the first pass,
        calculating a second adjustment factor for the second segment of the source content as a function of the second remaining target area value and the second remaining crash area value,
        based on the second adjustment factor, modifying the second segment to produce a second modified segment, and
        appending the second modified segment to a second content portion already laid out in the total target area; and
    providing the data object model to a browser engine for rendering.

* * * * *

UNITED STATES PATENT AND TRADEMARK OFFICE
CERTIFICATE OF CORRECTION

| | | |
|---|---|---|
| PATENT NO. | : 9,213,681 B2 | Page 1 of 1 |
| APPLICATION NO. | : 12/900948 | |
| DATED | : December 15, 2015 | |
| INVENTOR(S) | : Peter Sorotokin | |

It is certified that error appears in the above-identified patent and that said Letters Patent is hereby corrected as shown below:

In the claims:

In claim 1, column 9, line 27, insert the word --first-- before the word "segment".
In claim 1, column 9, line 31, insert the word --first-- before the word "segment".
In claim 1, column 9, line 32, insert the word --first-- before the word "modified".
In claim 1, column 9, line 60, insert a hard return before the word "providing".
In claim 10, column 10, line 32, replace the word "sing" with "using".
In claim 10, column 10, line 59, replace the word "determine" with "determines".
In claim 10, column 11, line 27, replace the "," following the word "segment" with a ";".
In claim 10, column 11, line 27, delete the word "and" after the word "segment".
In claim 18, column 12, line 10, replace the word "had" with the word "has".
In claim 18, column 12, line 10, insert a --,-- after the word "performed".

Signed and Sealed this
Nineteenth Day of April, 2016

Michelle K. Lee
*Director of the United States Patent and Trademark Office*